(12) United States Patent
Richard et al.

(10) Patent No.: US 8,464,750 B1
(45) Date of Patent: Jun. 18, 2013

(54) MAGNETOSTRICTIVE PRESSURE REGULATING SYSTEM

(75) Inventors: James A. Richard, Grant, AL (US); Herman L. Pickens, Gurley, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 277 days.

(21) Appl. No.: 12/826,887

(22) Filed: Jun. 30, 2010

(51) Int. Cl.
*F16K 31/12* (2006.01)
(52) U.S. Cl.
USPC ............... 137/487.5; 251/129.06; 251/129.04
(58) Field of Classification Search
USPC ......... 251/129.01, 129.06, 129.21; 137/487.5
See application file for complete search history.

(56) References Cited

U.S. PATENT DOCUMENTS

| | | | |
|---|---|---|---|
| 4,158,368 A | | 6/1979 | Clark |
| 4,289,987 A * | | 9/1981 | Russell et al. .................. 310/26 |
| 5,184,037 A * | | 2/1993 | Kobayashi et al. ............. 310/26 |
| 5,217,037 A * | | 6/1993 | Bristol ............................ 137/14 |
| 5,222,713 A | | 6/1993 | Lawless et al. |
| 5,249,117 A * | | 9/1993 | Greenough et al. ............ 700/30 |
| 5,630,709 A | | 5/1997 | Bar-Cohen |
| 5,905,210 A * | | 5/1999 | O'Boyle et al. ......... 73/862.331 |
| 6,026,847 A * | | 2/2000 | Reinicke et al. ............ 137/487.5 |
| 6,279,842 B1 * | | 8/2001 | Spain ........................ 239/585.1 |
| 6,307,286 B1 | | 10/2001 | Yamazaki et al. |
| 6,405,942 B1 * | | 6/2002 | Ruehle et al. ............... 239/102.2 |
| 6,561,436 B1 | | 5/2003 | Boecking |
| 6,702,250 B2 | | 3/2004 | Czimmek |
| 6,966,295 B2 | | 11/2005 | Yamaoka et al. |
| 7,323,960 B2 | | 1/2008 | Maruyama |
| 7,362,096 B2 * | | 4/2008 | Oberdier et al. .............. 324/209 |
| 7,469,878 B1 * | | 12/2008 | Richard .................... 251/129.06 |
| 2001/0045880 A1 | | 11/2001 | Czimmek |
| 2003/0137376 A1 | | 7/2003 | Czimmek |
| 2008/0212253 A1 | | 9/2008 | Finley et al. |

* cited by examiner

*Primary Examiner* — John K Fristoe, Jr.
*Assistant Examiner* — Matthew W Jellett
(74) *Attorney, Agent, or Firm* — Peter J. Van Bergen; James J. McGroary

(57) ABSTRACT

A magnetostrictive pressure regulating system includes a magnetostrictive valve that incorporates a magnetostrictive actuator with at least one current-carrying coil disposed thereabout. A pressure force sensor, in fluid communication with the fluid exiting the valve, includes (i) a magnetostrictive material, (ii) a magnetic field generator in proximity to the magnetostrictive material for inducing a magnetic field in and surrounding the magnetostrictive material wherein lines of magnetic flux passing through the magnetostrictive material are defined, and (iii) a sensor positioned adjacent to the magnetostrictive material and in the magnetic field for measuring changes in at least one of flux angle and flux density when the magnetostrictive material experiences an applied force that is aligned with the lines of magnetic flux. The pressure of the fluid exiting the valve causes the applied force. A controller coupled to the sensor and to the current-carrying coil adjusts a current supplied to the current-carrying coil based on the changes so-measured.

13 Claims, 4 Drawing Sheets

MAGNETOSTRICTIVE PRESSURE REGULATING SYSTEM

ORIGIN OF THE INVENTION

The invention was made by employees of the United States Government and may be manufactured and used by or for the Government of the United States of America for governmental purposes without the payment of any royalties thereon or therefor.

CROSS-REFERENCE TO RELATED PATENT APPLICATIONS

This patent application is co-pending with one related patent application entitled "FORCE SENSOR USING CHANGES IN MAGNETIC FLUX", filed by the same inventors and owned by the same assignee as this patent application.

BACKGROUND OF THE INVENTION

1. Field of the Invention

This invention relates to pressure regulating systems. More specifically, the invention is a pressure regulating system that uses magnetostrictive elements for pressure regulation.

2. Description of the Related Art

Adjustable valves are frequently incorporated in pressure regulating systems. Valve adjustments are typically made under the control of an automated closed-loop feedback system that constantly monitors and regulates pressure. Mechanical feedback based control systems are commonly used. These mechanical pressure regulating systems typically use an adjustable spring or trapped pressure as a reference force to balance the pressure force in a feedback loop. However, these types of devices are difficult to adjust in-situ and generally have large hysteresis and exhibit wide variations in pressure control due to environmental and media temperature ranges, supply pressures, volumes, and other factors.

Adjustable valves using magnetostrictive materials for their actuators are attractive for applications that will experience broad temperature, volume, and supply pressure ranges. The magnetostrictive actuators are moved when a magnetic field is applied thereto. Typically, the magnetic field is generated when electric current flows through one or more coils disposed about the magnetostrictive actuator. Valve adjustments are made by changing the amount of electric current supplied to the coil(s). The resulting flow output of the valve can be sensed (e.g., as a pressure) and then used as a feedback input to a controller that supplies the electric current to the coil(s). If the pressure is to remain steady (i.e., minimal drift from a set-point), small changes in the pressure must be readily and accurately detected with commensurate valve adjustments being quickly implemented.

SUMMARY OF THE INVENTION

Accordingly, it is an object of the present invention to provide a pressure regulating system.

Another object of the present invention is to provide a pressure regulating system that can operate in applications experiencing a broad range of operating temperatures.

Still another object of the present invention is to provide a pressure regulating system for use with magnetostrictive valves.

Other objects and advantages of the present invention will become more obvious hereinafter in the specification and drawings.

In accordance with the present invention, a magnetostrictive pressure regulating system includes a magnetostrictive valve that incorporates a magnetostrictive actuator with at least one current-carrying coil disposed thereabout. The magnetostrictive actuator controls a flow of fluid through the magnetostrictive valve. A pressure sensor is in fluid communication with the flow of fluid exiting the valve. The pressure sensor includes (i) a magnetostrictive material, (ii) a magnetic field generator in proximity to the magnetostrictive material for inducing a magnetic field in and surrounding the magnetostrictive material wherein lines of magnetic flux passing through the magnetostrictive material are defined, and (iii) a sensor positioned adjacent to the magnetostrictive material and in the magnetic field for measuring changes in at least one of flux angle and flux density when the magnetostrictive material experiences an applied force that is aligned with the lines of magnetic flux. The pressure of the fluid exiting the valve causes the applied force. A controller coupled to the sensor and to the current-carrying coil adjusts a current supplied to the current-carrying coil based on the changes so-measured thereby completing the pressure feedback.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
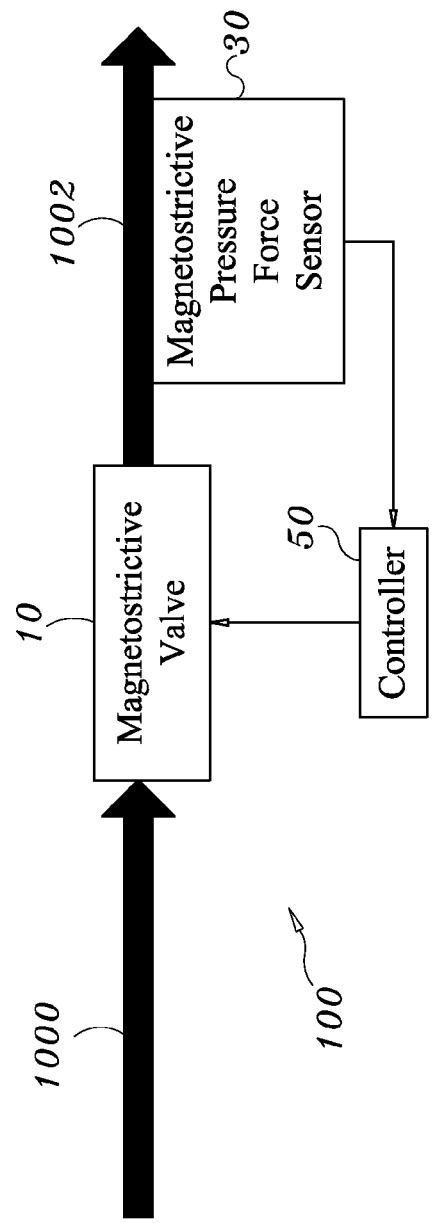
FIG. 1 is a schematic view of a magnetostrictive pressure regulating system in accordance with the present invention.

Referring now to the drawings and more particularly to FIG. 1, a magnetostrictive pressure regulating system in accordance with the present invention is shown and is referenced generally by 100. In FIG. 1, broad lines are indicative of a fluid flow and narrow lines are indicative of signals (e.g., control signals). The type fluid is not a limitation of the present invention.

Pressure regulating system 100 includes the following three major components: a magnetostrictive valve 10, a magnetostrictive pressure force sensor 30, and a controller 50.

Briefly, magnetostrictive valve 10 receives an incoming fluid flow 1000 and outputs a fluid flow 1002 in accordance with a position of valve 10. Magnetostrictive pressure force sensor 30 measures the pressure force in output fluid flow 1002 and provides a signal indicative thereof to controller 50. The sensed pressure force is used by controller 50 to generate a feedback control signal that controls the position of valve 10. For example, system 100 could be configured to provide a constant pressure in output fluid flow 1002. Controller 50 can range from a simple amplifier to a more complex microprocessor programmed with control algorithms that convert the sensed signal from sensor 30 to a control signal for valve 10.

Magnetostrictive valve 10 can be configured in a variety of ways without departing from the scope of the present invention. In general, valve 10 incorporates some type of magnetostrictive actuator that controls the fluid-flow position of valve 10. Typically, such an actuator has an electric current-carrying coil wrapped therearound. The current flowing in such a coil induces a magnetic field in the magnetostrictive actuator to thereby elongate same. By way of example, one type of magnetostrictive valve is disclosed in U.S. Pat. No. 7,469,878, the contents of which are hereby incorporated by reference. To facilitate a complete understanding of the present invention, the magnetostrictive valve disclosed in this patent is illustrated in FIG. 2.

Figure 2:
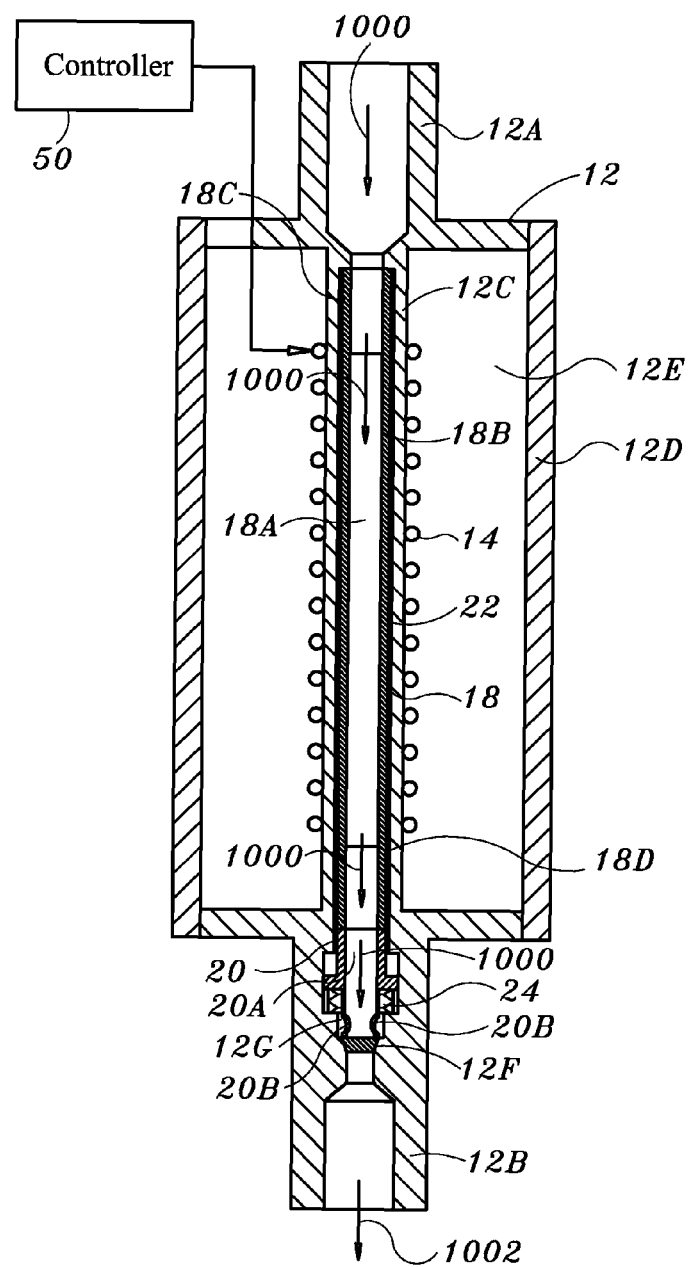
FIG. 2 is a cross-sectional view of a magnetostrictive valve assembly that can be incorporated in the magnetostrictive pressure regulating system of the present invention.

Briefly, the magnetostrictive valve illustrated in FIG. 2 has a rigid housing or body 12 defined by a fluid inlet 12A, a fluid outlet 12B, a passage 12C providing fluid communication between inlet 12A and outlet 12B, and an outer body 12D that defines an annular space 12E about passage 12C. An annular ridge or seat 12F is defined at one end of passage 12C on the inside thereof. The particular construction of body 12 or choice of materials for body 12 are not limitations of the valve provided that inlet 12A, passage 12C, and outlet 12B define a fluid flow path through body 12.

Disposed in annular space 12E between passage 12C and outer body 12D are one or more electrical current-carrying coils 14. More specifically, coil(s) 14 is wrapped about the outside of passage 12C. The control signal output of controller 50 in the form of an electrical current is coupled to coil(s) 14. The electric current from controller 50 governs the closing/opening of valve 10. In general, the closing of valve 10 occurs when a magnetostrictive assembly (disposed in passage 12C) elongates while the opening of valve 10 occurs when magnetostrictive assembly 18 contracts. Magnetostrictive assembly 18 defines an open-ended conduit that fits in passage 12C such that axial elongation and contraction thereof are supported by passage 12C. Accordingly, magnetostrictive assembly 18 slidingly fits in passage 12C and typically is defined by constant inside and outside diameters throughout the assembly.

Fluid flow 1000 flows through inlet 12A and into the hollow central portion 18A of magnetostrictive assembly 18. Coupled to one end of magnetostrictive assembly 18 adjacent seat 12E is a valve body 20 having a hollow core 20A aligned with hollow central portion 18A of magnetostrictive assembly 18. Hollow core 20A is in communication with one or more valve ports 20B formed in the periphery of valve body 20. When magnetostrictive assembly 18 is contracted (i.e., no current is flowing through coil(s) 14), the outboard end of valve body 20 is spaced apart from annular seat 12F. In this position, fluid flow 1000 flows through hollow core 20A, out ports 20B, and past annular seat 12E and into outlet 12B as output fluid flow 1002.

Magnetostrictive assembly 18 has a hollow tube 18B (e.g., a cylindrical tube) of magnetostrictive material that forms a sliding fit within passage 12C. To facilitate this type of fit, a non-stick material 22 (e.g., TEFLON or other suitable non-stick material) can be disposed between magnetostrictive assembly 18 and passage 12C. Non-stick material 22 can also take the form of a coating on the inside walls of passage 12C. The magnetostrictive material comprising tube 18B is any suitable type of such material that undergoes changes in axial length (e.g., lengthens) when disposed in a magnetic field. In the present invention, the magnetic field is generated when current flows through coil(s) 14. For aerospace applications where cryogenic temperatures are encountered, suitable magnetostrictive materials include, but are not limited to, terbium-based compounds such as Terfenol-D which is commercially available from Etrema Products, Inc., gallium-iron compounds such as Galfenol, and rare earth zinc crystal-based compounds such as Terzinol.

To improve the response times associated with the elongation/contraction of tube 18B and to make the amount of elongation/contraction repeatable and constant, valve 10 magnetically biases the magnetostrictive material and keeps it under axial compression at all times. With respect to the magnetic biasing of tube 18B, tubular permanent magnets 18C and 18D are disposed at either axial end of tube 18B. Magnetic forces generated by magnets 18C and 18D will generally be sufficient to keep the magnets in place provided body 12 is made from a non-magnetic material. However, magnets 18C and 18D could also be bonded to the axial ends of tube 18B. Magnets 18C and 18D align the magnetostrictive material's magnetic moments in the axial direction of tube 18B. By magnetically biasing tube 18B in this way, two advantages are achieved. First, elongation of tube 18B will be maximized when tube 18B is immersed in the magnetic field generated by coil(s) 14 as current flows therethrough. Second, the magnetic biasing reduces the amount of magnetic flux that must be produced by coil(s) 14 thereby increasing the valve's overall efficiency.

On their own, magnetostrictive materials do not typically elongate and contract at the same rate. However, by keeping magnetostrictive assembly 18 under axial compression at all times, the difference between the rate of elongation and the rate of contraction of tube 18B is reduced enough that the two rates can be considered to be approximately the same rate. In the illustrated embodiment, this constant compressive force is achieved by means of a spring assembly 24 (e.g., a stack of one or more Belleville washers) that is disposed and captured between valve body 20 and an annular ridge 12G formed in body 20.

Figure 3:
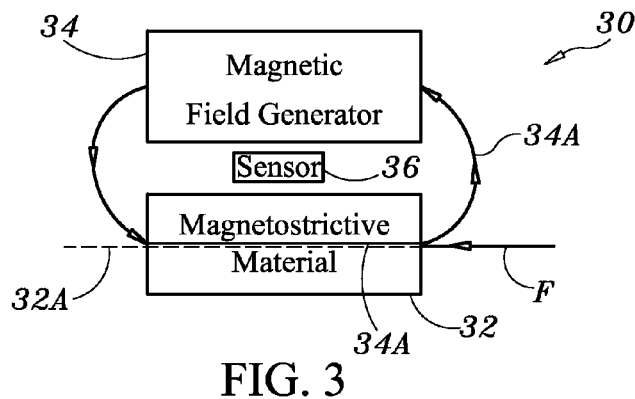
FIG. 3 is a top-level schematic view of a pressure force sensor that uses change in flux.

Referring now to FIG. 3, an embodiment of pressure force sensor 30 that uses change in flux as the means to sense force changes in output fluid flow 1002 is shown. It is to be understood that pressure force sensor 30 can be realized by a variety of embodiments thereof without departing from the scope of the present invention. In support of this assertion, several embodiments of pressure force sensors constructed in accordance with the present invention will be described later herein.

At the heart of pressure force sensor 30 is a magnetostrictive material 32 that undergoes change in permeability when a change in force is applied thereto along an axis thereof while material 32 is disposed in a magnetic field having flux lines that are substantially aligned with the axis. In the illustration, the changing force that is applied to magnetostrictive material 32 lies along dashed line 32A. Pressure force sensor 30 also includes a magnetic field generator 34 capable of producing a magnetic field near material 32 such that an induced magnetic field in and around material 32 causes magnetic flux 34A to pass through material in substantial alignment with direction 32A. In other words, magnetic field generator 34 provides a magnetizing force, H, that induces a magnetic field having a magnetic flux density, B, in material 32. Flux density B is equal to μH where μ is the permeability of material 32. The magnitude and direction of the magnetic field inside and surrounding material 32 is dependent upon H, μ, and the orientation of the magnetic domains within material 32. The permeability of material 32 and the orientation of its domains change when a force is applied to material 32.

Pressure force sensor 30 also includes a magnetic flux sensor 36 positioned adjacent to magnetostrictive material 32 and in the magnetic field thereof. Magnetic flux sensor 36 is any sensor(s) capable of detecting magnetic flux density and/or magnetic flux angle in, for example, a planar dimension of interest. In the absence of any force being applied to material 32 along dimension 32A, the internal and external magnetic fields associated with material 32 will be static in both magnitude and direction. However, when a force, F, is applied along direction 32A, the magnetic domains of material 32 rotate. Note that while force F is illustrated as a compressive force on material 32, it could also be an extensive or tensile force acting on material 32. In either case, rotation of the magnetic domains causes the internal and external magnetic fields to change in both magnitude and direction, thereby changing the magnetic flux density and flux angle. Accordingly, sensor 36 can be a flux density sensor for detecting flux density change proportioned to force F, or a magnetic angle sensor for detecting angular change in a flux line (vector) caused by force F where such angular change can be measured in a particular plane of reference or in three dimensions. In each case, pressure force sensor 30 would be calibrated prior to use in order to equate known values of force F with corresponding changes in flux density or flux angle.

As mentioned above, the pressure force sensor can be realized by a variety of embodiments. For example, the magnetostrictive material could reside in a free-space environment. However, the sensor(s) required to detect flux changes in a free-space-based force sensor would necessarily have to be extremely sensitive since much of the generated magnetic field would be dispersed in free space. Accordingly, it may be desirable to construct embodiments of the pressure force sensor that concentrate the magnetic field in and around the magnetostrictive material. With this goal in mind, several illustrative and non-limiting embodiments of the pressure force sensor will be described with the aid of FIGS. 4-8.

Figure 4:
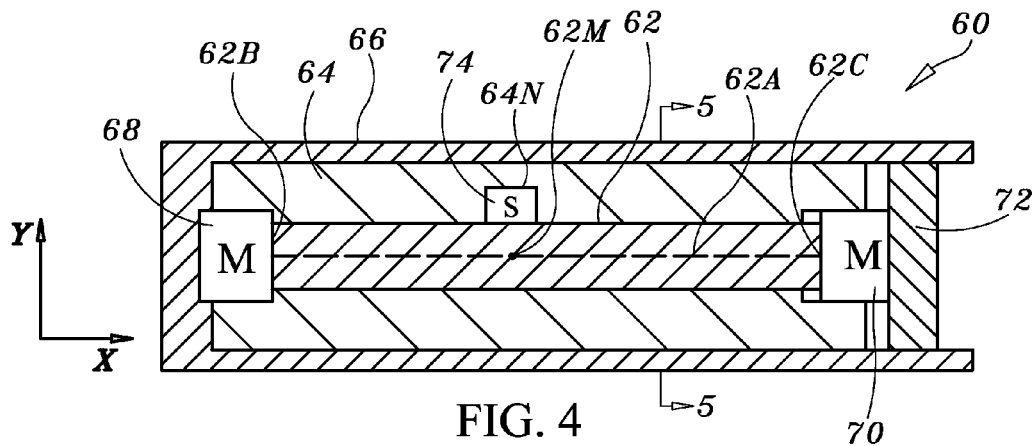
FIG. 4 is a cross-sectional view of a pressure force sensor using two permanent magnets in accordance with an embodiment of the present invention.
Figure 5:
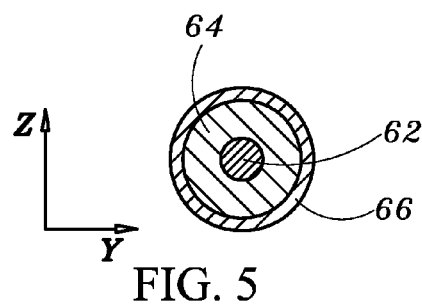
FIG. 5 is a cross-sectional view of the pressure force sensor in FIG. 4 taken along line 5-5 thereof.

Referring first to FIGS. 4 and 5, a pressure force sensor 60 uses a rod 62 of magnetostrictive material. Rod 62 is an elongated piece of magnetostrictive material whose radial cross-section could be any shape (e.g., circular as shown, triangular, rectangular, octagonal, etc.) without departing from the scope of the present invention. Regardless of its cross-sectional shape, rod 62 will have a longitudinal axis (referenced by dashed line 62A) with opposing longitudinal ends noted by numerals 62B and 62C. Rod 62 further has a center of mass indicated at numeral 62M.

The particular choice of magnetostrictive material is not a limitation of the present invention. For aerospace applications where cryogenic temperatures are encountered, suitable magnetostrictive materials include, but are not limited to, terbium-based compounds such as Terfenol-D which is commercially available from Etrema Products, Inc., gallium-iron compounds such as Galfenol, and rare earth zinc crystal-based compounds such as Terzinol.

Rod 62 is encased within a guide 64 that supports and protects rod 62. Guide 64 is made from a non-magnetic or low magnetic permeability material, and is sized such that rod 62 slides within guide 64. The assembly of rod 62 and guide 64 is fitted within an open-ended housing 66 made from a magnetic material having high permeability and low hysteresis. That is, the purpose of housing 66 is to provide a low reluctance path for a magnetic field as will be explained further below. In the illustrated embodiment, guide 64 defines a cylindrical outer surface and housing 66 is an open-ended cylinder. However, it is to be understood that the outer surface of guide 64 and housing 66 could take other geometric shapes without departing from the scope of the present invention. Further, housing 66 could be a one-piece housing or a multiple-piece assembly thereof without departing from the scope of the present invention.

Positioned at opposing longitudinal ends 62B and 62C of rod 62 are permanent magnets ("M") 68 and 70, respectively. The purpose of magnets 68 and 70 is to provide a magnetizing force H that induces the magnetic field in and around rod 62 as will be explained below. In the illustrated embodiment, magnets 68 and 70 are retained by guide 64 with magnet 68 abutting the end of housing 66 and magnet 70 slidingly fitted in guide 64 for reasons that will be explained below.

A piston 72 is slidingly fit within housing and abuts magnet 70. Piston 72 is similar to housing 66 in terms of its material construction, i.e., magnetic material with high permeability and low hysteresis. Typically, piston 72 is made from the same material as housing 66.

A flux sensor ("S") 74 is positioned adjacent a surface of rod 62. For example, flux sensor 74 could be retained within a notch 64N formed in guide 64 adjacent to a radial surface of rod 62 at a location along rod 62 that is aligned with its center of mass 62M. This is a typical placement for flux sensor 74 when it is a magnetic flux angle sensor that is sensitive to flux angle changes in a two-dimensional plane such as the x-y plane, i.e., the plane formed with the x-direction along longitudinal axis 62A and the y-direction along a radius from axis 62A. Note that a different orientation of such a flux sensor 74 could make measurements in an x-z or y-z plane. When flux density is to be measured, a flux density sensor (not shown) is typically positioned adjacent to an axial end of rod 62. For clarity of illustration, electrical connections between sensor 74 and a data acquisition system (not shown) have been omitted. Such connections and data acquisition systems (or wireless versions thereof) are well understood in the art.

Figure 6:
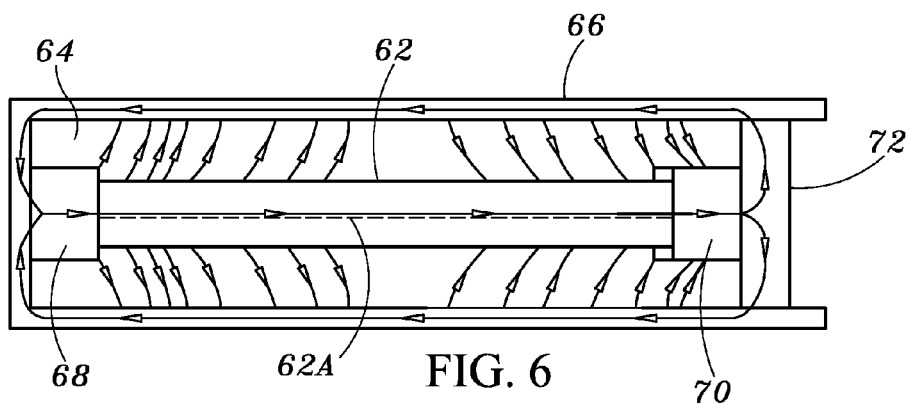
FIG. 6 illustrates the lines of magnetic flux present in the pressure force sensor during a static state thereof.

The combination of housing 66, magnets 68/70, and piston 72 essentially form a magnetic field generator that induce and confine/concentrate a magnetic field/flux lines in and surrounding rod 62. The lines of magnetic flux are illustrated in FIG. 6 (where crosshatch lines are omitted for clarity) where the lines of magnetic flux in rod 62 are essentially aligned with its longitudinal axis 62A. As a result, a closed loop magnetic path is defined by the combination of housing 66, magnets 68/70, piston 72, and rod 62. The lines of magnetic flux illustrated in FIG. 6 are depicted for a static condition, i.e., no force being applied to piston 72.

When a force is applied to piston 72, at least a component of this force will act on piston 72 such that it slides in guide 64. For example, if the axial component of the force drives piston 72 into housing 66, a compressive axial force is applied to rod 62 as piston 72 pushes magnet axially against end 62C of rod 62. This causes the magnetic domains of rod 62 to rotate, thereby changing the angular orientation of the flux lines where such change (e.g., relative to the static condition) is sensed by flux sensor 74. Note that if the force sensor must be sensitive to an extensive or tensile force, piston 72, magnet 70 and end 62C of rod 62 must be coupled to one another.

Figure 7:
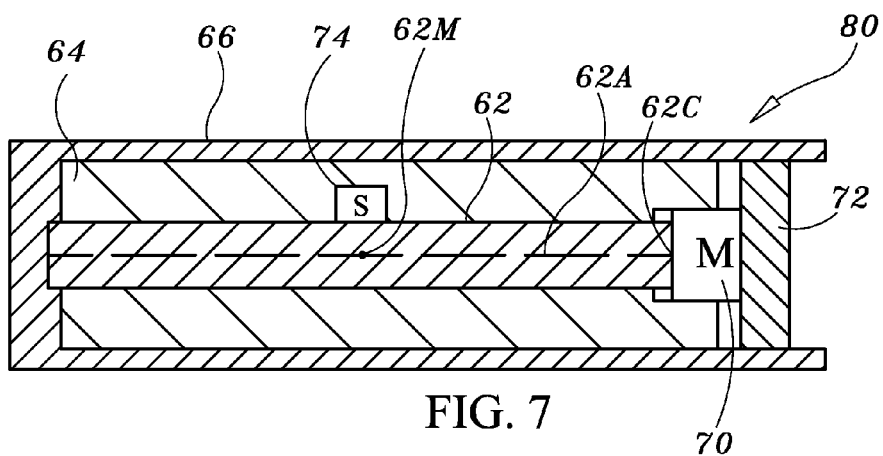
FIG. 7 is a cross-sectional view of a pressure force sensor using one permanent magnet in accordance with another embodiment of the present invention.
Figure 8:
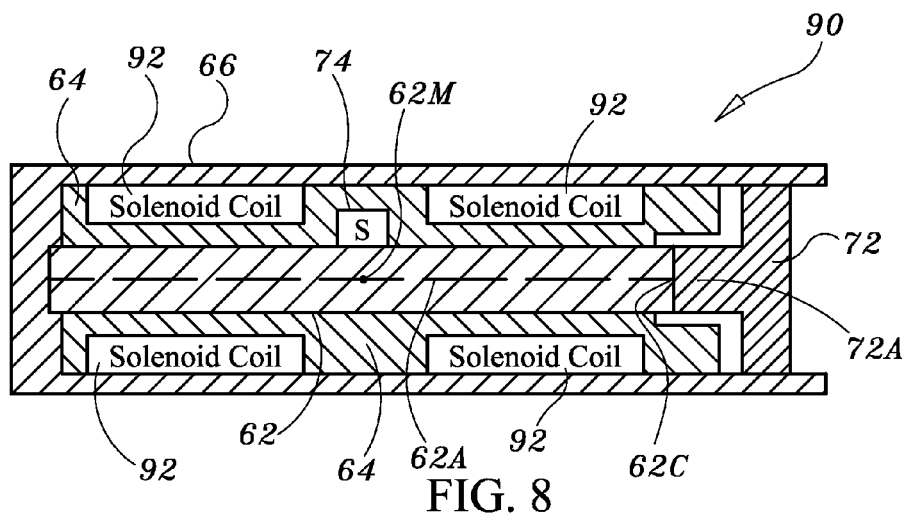
FIG. 8 is a cross-sectional view of a pressure force sensor using electromagnets in accordance with another of the embodiment of the present invention.

As mentioned above, the principles of the present invention could be practiced in a variety of embodiments. For example, FIG. 7 illustrates another embodiment of the present invention where pressure force sensor 80 uses essentially the same components just described, but only uses a single permanent magnet 70 to produce the magnetizing force for rod 62. FIG. 8 depicts another embodiment of the present invention where a pressure force sensor 90 utilizes an electromagnet(s) to produce the magnetizing force. More specifically, one or more solenoid coils 92 are wrapped about guide 64 along rod 62. For example, two solenoid coils 92 could be used to facilitate the placement of sensor 74. Electrical connections to coils 92 as well as their drive source are omitted for clarity of illustration. In this example, piston 72 will typically include a plunger portion 72A slidingly fitted in guide 64 and abutting (or coupled to) longitudinal end 62C of rod 62. The operating principles of these additional embodiments are the same as previously described.

The advantages of the present invention are numerous. The fast response times of a magnetostrictive valve and a magnetostrictive pressure force sensor provide a pressure regulating system that can maintain a set point with minimal drift. Tight control of a fluid pressure is needed for a broad range of applications such as fuel delivery in aerospace applications. Since the moving parts in the system are driven by magnetostrictive materials, the pressure regulating system can be used in applications having a broad range of operational temperatures. The use of magnetostrictive materials further allows the pressure regulating system to be used in cryogenic temperature regimes.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetostrictive pressure regulating system, comprising:
   a magnetostrictive valve that includes a magnetostrictive actuator with at least one current-carrying coil disposed thereabout, said magnetostrictive actuator controlling a flow of fluid through said magnetostrictive valve;
   a pressure force sensing assembly that includes (i) a rod made from a solid piece of magnetostrictive material, said rod having a longitudinal axis, (ii) a non-magnetic housing encasing said rod and supporting sliding movement of said rod therein in a direction aligned with said longitudinal axis thereof, (iii) a magnetic field generator supporting said housing and said rod and inducing a magnetic field in and surrounding said rod wherein lines of magnetic flux pass through said rod and are substantially aligned with said longitudinal axis thereof, and (iv) a magnetic flux sensor positioned adjacent to said rod, approximately aligned with a center of mass of said rod, and in said magnetic field for measuring changes in flux angle when said rod experiences an applied force that is aligned with said longitudinal axis thereof, said pressure force sensing assembly adapted to be in fluid communication with the fluid exiting said magnetostrictive valve wherein pressure of the fluid causes said applied force; and
   a controller coupled to said magnetic flux sensor and to said at least one current-carrying coil for adjusting a current supplied to said at least one current-carrying coil based on said changes so-measured by said magnetic flux sensor.

2. A magnetostrictive pressure regulating system as in claim 1, wherein said magnetic field generator includes at least one permanent magnet.

3. A magnetostrictive pressure regulating system as in claim 1, wherein said magnetic field generator includes at least one electromagnet.

4. A magnetostrictive pressure regulating system as in claim 1, wherein a combination of said rod and said magnetic field generator comprise a closed-loop magnetic path.

5. A magnetostrictive pressure regulating system as in claim 1, wherein said magnetostrictive actuator and said magnetostrictive material are selected from the group consisting of terbium-based compounds, gallium-iron compounds, and rare earth zinc crystal-based compounds.

6. A magnetostrictive pressure regulating system as in claim 1, wherein said magnetostrictive actuator is tubular to support the flow therethrough.

7. A magnetostrictive pressure regulating system, comprising:
   a magnetostrictive valve that includes a magnetostrictive actuator with at least one current-carrying coil disposed thereabout, said magnetostrictive actuator controlling a flow of fluid through said magnetostrictive valve;
   a pressure force sensing assembly that includes (i) a rod made from a solid piece of magnetostrictive material, said rod having a longitudinal axis, (ii) a non-magnetic housing encasing said rod and supporting sliding movement of said rod therein in a direction aligned with said longitudinal axis thereof, (iii) a magnetic field generator supporting said housing and said rod and inducing a magnetic field in and surrounding said rod wherein lines of magnetic flux pass through said rod and are substantially aligned with said longitudinal axis thereof, said magnetic field generator including a movable piston made from a magnetic material, said piston coupled to a first of opposing longitudinal ends of said rod for movement in a direction aligned with said longitudinal axis of said rod, and (iv) a magnetic flux sensor positioned adjacent to a surface of said rod and approximately aligned with a center of mass thereof for measuring changes in flux angle when said piston experiences said movement wherein a force is applied to said rod that is aligned with said longitudinal axis thereof, said pressure force sensing assembly adapted to be in fluid communication with the fluid exiting said magnetostrictive valve wherein a pressure force of the fluid exiting said magnetostrictive valve is applied to said piston thereby causing said movement thereof in said direction aligned with said longitudinal axis of said rod wherein said rod experiences said compressive force; and
   a controller coupled to said magnetic flux sensor and to said at least one current-carrying coil for adjusting a current supplied to said at least one current-carrying coil based on said changes so-measured by said magnetic flux sensor.

8. A magnetostrictive pressure regulating system as in claim 7, wherein said magnetic field generator includes a permanent magnet positioned between said piston and said first of said opposing longitudinal ends of said rod.

9. A magnetostrictive pressure regulating system as in claim 7, wherein said magnetic field generator further includes a second permanent magnet positioned adjacent to a second of said opposing longitudinal ends of said rod.

10. A magnetostrictive pressure regulating system as in claim 7, wherein said magnetic field generator includes at least one electromagnet disposed about said radial surface of said rod.

11. A magnetostrictive pressure regulating system as in claim 7, wherein a combination of said rod and said magnetic field generator comprise a closed-loop magnetic path.

12. A magnetostrictive pressure regulating system as in claim 7, wherein said magnetostrictive actuator and said magnetostrictive material are selected from the group consisting of terbium-based compounds, gallium-iron compounds, and rare earth zinc crystal-based compounds.

13. A magnetostrictive pressure regulating system as in claim 7, wherein said magnetostrictive actuator is tubular to support the flow therethrough.

\* \* \* \* \*